United States Patent
Gallagher et al.

(10) Patent No.: US 6,964,744 B2
(45) Date of Patent: Nov. 15, 2005

(54) SURFACTANT MODIFIED OILS FOR DUST CONTROL OF LOOSE-FILL INSULATION

(75) Inventors: Kevin J. Gallagher, Plymouth Meeting, PA (US); Christophe J. Wagner, Athens, GA (US); Claire Calero, Erquery (FR); Daniel Lacaute, Orry la Ville (FR)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 10/136,008

(22) Filed: May 1, 2002

(65) Prior Publication Data

US 2003/0205695 A1 Nov. 6, 2003

(51) Int. Cl.⁷ .................................................. C09K 3/22
(52) U.S. Cl. ..................................... 252/88.1; 252/88.2
(58) Field of Search .......................... 252/88.1; 44/602; 428/370, 378, 382, 357

(56) References Cited

U.S. PATENT DOCUMENTS

| | | | |
|---|---|---|---|
| 3,861,895 A | * 1/1975 | Tarazi | 65/3 |
| 4,773,960 A | 9/1988 | Vincelli et al. | |
| 4,957,559 A | * 9/1990 | Tiesler et al. | 106/170 |
| 4,960,532 A | * 10/1990 | Kremer | 252/88 |
| 5,352,780 A | 10/1994 | Webb et al. | |
| 5,514,222 A | * 5/1996 | Williams | 134/42 |
| 5,595,782 A | * 1/1997 | Cole | 427/212 |
| 5,683,810 A | 11/1997 | Babbitt et al. | |
| 5,908,501 A | * 6/1999 | Pucillo | 106/634 |
| 6,005,662 A | 12/1999 | Ence | |
| 6,122,054 A | 9/2000 | Ence | |
| 2002/0188055 A1 | * 12/2002 | Chen et al. | 524/494 |

FOREIGN PATENT DOCUMENTS

| | | |
|---|---|---|
| EP | 0 922 683 | 6/1999 |
| EP | 0922683 | 6/1999 |
| JP | 53162253 | 12/1978 |
| JP | 54034253 | 3/1979 |
| JP | 55-90537 | 7/1980 |
| JP | 55-127447 | 10/1980 |
| JP | 08003655 | 1/1996 |
| JP | 09241460 | 9/1997 |

* cited by examiner

Primary Examiner—Charles Boyer
Assistant Examiner—D G Hamlin
(74) Attorney, Agent, or Firm—Duane Morris LLP

(57) ABSTRACT

The present invention serves to substantially improve the dust capture property of dedusting oils, by modifying these oils with nonionic and/or cationic surfactants. The application of surfactant modified oils reduces dust that is generated when loose-fill insulation is installed.

19 Claims, No Drawings

SURFACTANT MODIFIED OILS FOR DUST CONTROL OF LOOSE-FILL INSULATION

FIELD OF THE INVENTION

The present invention relates to methods for improving the dust capture properties of dedusting oils, which properties are useful in the manufacture and installation of loose-fill insulation.

BACKGROUND OF THE INVENTION

Over the past 40 years, many homeowners have begun to install extra insulation in their attics or crawlspaces in an effort to save money on heating bills. Typically, new construction is thoroughly insulated in accordance with applicable building codes and industry standards. A common form of insulation used by consumers and insulation contractors has been fiberglass insulation batts and blankets. However, insulation batts are relatively expensive and may require some cutting and shaping during installation.

More recently, the use of glass fiber blowing wool or loose-fill insulation has increased in popularity. Loose-fill, fiberglass insulation exists in many forms. Bonded and non-bonded loose-fill fiberglass are commonly used terms to describe loose-fill insulation products. Bonded loose-fill insulation is derived from blanket or batt insulation which has been made with a thermoset binder. It is produced by either pulverizing or cutting the blanket or batt insulation, compressing the resulting product and packaging it into bags. Non-bonded, loose-fill insulation comprises smaller nodules of traditional, straight, short fibers which are treated with a dedusting oil, compressed, and packaged into bags. Both bonded and non-bonded loose fill insulations can be installed in attics and sidewalls using a pneumatic blowing machine.

Loose-fill insulation is popular with insulation contractors because it can be easily and quickly applied in both new construction as well as in existing structures. Further, loose-fill insulation is a relatively low cost material. However, fiberglass loose-fill insulation is typically applied by contractors rather than homeowners because of the special blowing equipment needed. Such insulation is typically packaged in large bags weighing e.g., 25–35 lbs.

Cellulose loose-fill insulation is another type of insulation commonly used by consumers, which is formed from shredded, recycled newspapers. Cellulose insulation is desirable for installation by consumers as it is available in smaller packages and is less expensive than most other forms of loose-fill insulation. However, such insulation is dusty, dirty and difficult to blow properly, and also requires special blowing equipment to install.

When loose-fill insulations are pneumatically applied, they can be the source of dust and irritation for the installer. While dedusting oils are typically applied at the time of manufacture to control this dust, and the installers are advised to wear a dust mask and protective gear to reduce their exposure to dust, the effectiveness of these oils could be improved, especially when the oils are applied at low application rates (e.g., less than about 2% by weight).

SUMMARY OF THE INVENTION

The purpose of the present invention is to substantially improve the dust capture properties of dedusting oils by modifying these oils with nonionic and/or cationic surfactants. These surfactants may be added individually, or in combination to the dedusting oils. The application of surfactant modified oils reduces the airborne dust that is generated when loose-fill insulation is installed pneumatically.

DESCRIPTION OF THE PREFERRED EMBODIMENTS

The present invention serves to substantially improve the dust capture property of dedusting oils, by modifying these oils with effective amounts of nonionic or cationic surfactants. In testing of the present invention, oils which were modified with various surfactants were applied through an oil application system onto non-bonded, loose-fill insulation, at a preferred amount of approximately 2% by weight using either air atomized or hydraulic pressure nozzles. One such oil is commercially available as Telura™ 720E from Exxon Mobil Corporation. The non-bonded, loose-fill material was packaged and tested for its dust generation characteristics. When compared to a control material made with an unmodified paraffin oil with a viscosity of 100 SUS, the non-bonded, loose-fill product made with the surfactant modified oil exhibited substantially lower dust levels. Furthermore, by the method of the present invention, the surfactant modified oils reduce dust levels of insulation that are produced over a range of fiberizing conditions.

Note that the treatment of the present invention should be applied to loose-fill insulation at a temperature at or above about 80° F., preferably from about 80–110° F.

The following testing demonstrates that the use of surfactant modified oils significantly reduced the airborne dust levels of a sample of thermal insulation product, as compared to similar insulations made with conventional dedusting oils. Dust levels were measured using the methodology as disclosed in U.S. Pat. Nos. 6,005,662 and 6,122,054, herein incorporated by reference. Two distinct fiberizing conditions were tested. One condition had a fiber fineness index of 2.9 and the other had a fineness index of 2.65 when measured by ASTM D1488-97 standard test method for micronaire reading of cotton fibers. In general, finer fibers tend to produce more dust.

Table 1 shows the % increase in dust reduction when loose-fill insulation made with the experimental oils was compared to loose fill insulation using the standard dedusting oil, Prorex 100 made by Exxon Mobil.

TABLE 1

| | % Dust Reduction Measured versus Standard Dust Control Oil (Control) | | |
|---|---|---|---|
| Treatment | Fiber Fineness | % Oil Applied to Loose Fill | % Increase in Dust Reduction |
| Standard Dust Control Oil[1] | 2.90 | 2.00 | Control |
| Surfactant Modified Oil - Telura 720E[2] | 2.90 | 1.90 | 28% |
| Standard Dust Control Oil[1] | 2.65 | 1.87 | Control |
| Surfactant Modified Oil - Telura 720E[2] | 2.65 | 1.87 | 53% |
| Surfactant Modified Oil - Telura 720E[3] | 2.65 | 1.80 | 46% |
| Standard Oil Modified with a Cationic Surfactant[4] | 2.65 | 1.97 | 25% |

[1]Prorex™ 100 Process oil from Exxon Mobil
[2]Telura™ 702E oil modified with glycerol monooleate at 2% by weight
[3]Telura™ 702E oil modified with glycerol monooleate at 1% by weight
[4]Prorex™ 100 Process Oil modified with an oil containing a quaternary ammonium compound As noted above, in a preferred embodiment of the present invention, the surfactant modified oil tested was a standard dust control oil, modified to include 2% by weight of glycerol monooleate, a nonionic surfactant. Percents by weight of surfactant may range from about 0.5–10%. It is anticipated that alternative nonionic surfactants would also be effective, e.g., mono-, di-, and tri-fatty acid esters of glycerol and modified esters of this type, so long as effective amounts of such surfactants were applied.

In a preferred embodiment of the present invention, the nonionic surfactant is a monoester of an unsaturated or saturated acid. The unsaturated acid may be e.g., linoleic or linolenic acid. The saturated acid may be e.g., a C12 to C18 lauric, myristic, palmitic or stearic acid. In a further preferred embodiment, the nonionic surfactant is a diester or triester of an unsaturated or saturated acid.

As it relates to the loose-fill insulation, it is preferred that the modified oil be applied to the loose-fill insulation at from about 0.5–2.5% by weight, with an amount of about 2.0% by weight particularly preferred.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of controlling dust formation in loose-fill insulation, consisting essentially of applying to said loose-fill insulation a dust inhibiting amount of a combination of a dedusting oil and a surfactant.

2. The method as recited in claim 1, wherein said combination is applied to said loose-fill insulation in an amount of from about 0.5–2.5% by weight.

3. The method as recited in claim 1, wherein said surfactant is nonionic.

4. The method as recited in claim 1, wherein said surfactant is cationic.

5. The method as recited in claim 1, wherein said insulation is installed pneumatically.

6. The method as recited in claim 3, wherein said surfactant is glycerol monooleate.

7. The method is recited in claim 1, wherein said combination is applied to said loose-fill insulation in an amount of about 2% by weight.

8. The method as recited in claim 3 wherein said nonionic surfactant is a monoester of an unsaturated or saturated acid.

9. The method as recited in claim 8 wherein said unsaturated acid is linoleic or linolenic acid.

10. The method as recited in claim 8 wherein said saturated acid is a C12 to C18 lauric, myristic, palmitic to stearic acid.

11. The method as recited in claim 3 wherein said nonionic surfactant is a diester or triester of an unsaturated or saturated acid.

12. A method of controlling dust formation in loose-fill insulation, consisting essentially of applying to said loose-fill insulation a dust inhibiting amount of a combination of a dedusting oil and a nonionic surfactant.

13. The method as recited in claim 12, wherein said insulation is installed pneumatically.

14. The method as recited in claim 13, wherein said combination is applied to said loose-fill insulation in an amount of from about 1.5–2.5% by weight.

15. The method as recited in claim 13, wherein said nonionic surfactant is glycerol monooleate.

16. The method as recited in claim 12 wherein said nonionic surfactant is a monoester of an unsaturated or saturated acid.

17. The method as recited in claim 13 wherein said unsaturated acid is linoleic or linolenic acid.

18. The method as recited in claim 13 wherein said saturated acid is a C12 to C18 lauric, myristic, palmitic to stearic acid.

19. The method as recited in claim 12 wherein said nonionic surfactant is a diester or triester of an unsaturated or saturated acid.

* * * * *